United States Patent
Nakayama et al.

(10) Patent No.: US 6,469,612 B2
(45) Date of Patent: Oct. 22, 2002

(54) SEMICONDUCTOR CERAMIC HAVING A NEGATIVE TEMPERATURE COEFFICIENT OF RESISTANCE AND NEGATIVE TEMPERATURE COEFFICIENT THERMISTOR

(75) Inventors: Akinori Nakayama, Otsu; Satoshi Fujita, Kyoto, both of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/976,128

(22) Filed: Oct. 11, 2001

(65) Prior Publication Data
US 2002/0074657 A1 Jun. 20, 2002

(30) Foreign Application Priority Data
Oct. 11, 2000 (JP) ......................... 2000-310267

(51) Int. Cl.[7] .................................. H01L 7/10
(52) U.S. Cl. ..................... 338/22 RE; 338/22 SD; 252/519.1
(58) Field of Search .................. 338/22 R, 22 SD; 252/518.1, 519.1

(56) References Cited

U.S. PATENT DOCUMENTS

| | | | | |
|---|---|---|---|---|
| 2,645,700 A | * | 7/1953 | Morin | 338/22 SD |
| 3,510,820 A | * | 5/1970 | Jonker et al. | 338/22 R |
| 4,324,702 A | * | 4/1982 | Matsuo et al. | 338/22 R |
| 4,347,166 A | * | 8/1982 | Tosaki et al. | 252/519 |
| 4,531,110 A | * | 7/1985 | Johnson Jr. et al. | 338/22 R |
| 4,729,852 A | * | 3/1988 | Hata | 252/518 |
| 4,840,925 A | * | 6/1989 | Rousset et al. | 501/1 |
| 4,891,158 A | * | 1/1990 | Hata | 252/518 |
| 5,246,628 A | * | 9/1993 | Jung et al. | 252/519 |
| 5,661,094 A | * | 8/1997 | Feltz et al. | 501/126 |
| 5,976,421 A | * | 11/1999 | Groen | 252/521.2 |
| 6,099,164 A | * | 8/2000 | Rosen et al. | 374/185 |

* cited by examiner

Primary Examiner—Karl D. Easthom
(74) Attorney, Agent, or Firm—Dickstein, Shapiro, Morin & Oshinsky, LLP.

(57) ABSTRACT

A semiconductor ceramic having a negative temperature coefficient of resistance, the element comprising about 0.1 to 20 mol % of $AMnO_3$ (A represents at least one of Ca, Sr, Ba, La, Pr, Nd, Sm, Eu, Gd, Tb, Dy and Ho) and to a spinel composite oxide made of a solid solution of Mn and at least one element in Ti, V, Cr, Fe, Co, Ni, Cu, Zn, Mg and Al. As a perovskite Mn composite oxide, one or more of $CaMnO_3$, $SrMnO_3$, $BaMnO_3$, $LaMnO_3$, $PrMnO_3$, $NdMnO_3$, $SmMnO_3$, $EuMnO_3$, $GdMnO_3$, $TbMnO_3$, $DyMnO_3$ and $HoMnO_3$ may be used.

12 Claims, 1 Drawing Sheet

SEMICONDUCTOR CERAMIC HAVING A NEGATIVE TEMPERATURE COEFFICIENT OF RESISTANCE AND NEGATIVE TEMPERATURE COEFFICIENT THERMISTOR

BACKGROUND OF THE INVENTION

1. Field of the Invention

The present invention relates to a semiconductor ceramic having a negative temperature coefficient of resistance and a negative temperature coefficient thermistor.

2. Description of the Related Art

In recent years, more accurate negative temperature coefficient thermistors, which are mainly used as temperature sensors, have been required. It has also been required that the variation of resistance be controlled to be within plus or minus one percent. Conventionally, spinel composite oxides made of a solid solution of Mn and at least one element from the group Zn, Mg, Al, and transition elements (Ti, V, Cr, Fe, Co, Ni, Cu) excluding Mn have been used as semiconductor ceramics used in such negative temperature coefficient thermistors. However, it is generally known that the composite oxide creates a problem of environmental resistance. It is believed that the problem is caused by Mn ions changing their state of oxidation and migrating between sites in accordance with changes in the environmental temperature and the partial pressure of oxygen.

In order to solve this problem, research has been conducted, and in a paper by B. Gillot et al. (Solid State Ionics, 48, 93–99, 1991) and a paper by A. Rousset (Journal of the European Ceramic Society, 13, 185–95, 1994), a method wherein barium is added when raw materials are input is reported. According to these papers, because barium has an ionic radius which is larger than the ionic radius of the transition elements, barium is not solid soluble in a spinel phase and exists in grain boundaries and at a triple point by forming a different phase. Because such a construction is formed, changes in resistance are greatly suppressed in high temperature environments of 125° C.

Furthermore, in Japanese Examined Patent Application Publication No. 6-48641, it is stated that changes in resistance are controlled in a high-temperature environment at 125° C. by adding an oxide of a rare earth element or oxides of aluminum and a rare earth element to a thermistor element made of oxides of Mn and Ni.

However, according to the methods described in the above-mentioned papers and patent application publication, because free water-soluble barium ions are likely to remain in the raw material and sinter, gelation of binders takes place deteriorating the moldability, and the oxide of unreacted rare earth elements becomes likely to remain. As a result, swelling of molded bodies occurs due moisture absorption and new problems of performance in highly humid environments are occur. These facts were made clear by the experiments conducted by the present inventors and others.

SUMMARY OF THE INVENTION

Therefore, it is an object of the present invention to provide a semiconductor ceramic having a negative temperature coefficient of resistance and a negative temperature coefficient thermistor which are good in moldability and highly reliable under high humidity environments.

In order to achieve the above object, in a semiconductor ceramic having a negative temperature coefficient of resistance according to the present invention, about 0.1 to 20 mol % of AMnO3 (A represents at least one of Ca, Sr, Ba, La, Pr, Nd, Sm, Eu, Gd, Tb, Dy and Ho) is added to a spinel composite oxide comprising a solid solution of Mn and at least one Ti, V, Cr, Fe, Co, Ni, Cu, Zn, Mg and Al element.

Furthermore, at least a pair of electrodes is provided on the surface of or inside an element assembly comprising the semiconductor ceramic in a. negative temperature coefficient thermistor according to the present invention.

Regarding the addition of Ca, Sr, Ba, La, Pr, Nd, Sm, Eu, Gd, Tb, Dy, and Ho at the time when the semiconductor ceramic is produced, because free water-soluble ions and the oxide of rare earth elements are reduced after firing and sintering by selection of a perovskite Mn composite oxide, a negative temperature coefficient thermistor of a small variation in characteristics, in which the swelling of the molded body caused by reaction of binders and water absorption is suppressed and the reliability under high humidity environments is excellent, can be obtained.

According to the present invention, $CaMnO_3$, $SrMnO_3$, $BaMnO_3$, $LaMnO_3$, $PrMnO_3$, $NdMnO_3$, $SmMnO_3$, $EuMnO_3$, $GdMnO_3$, $TbMnO_3$, $DyMnO_3$ and $HoMnO_3$ may be used as the perovskite Mn composite oxide. One of these may be used or two or more may be used together.

The reason why the addition of $AMnO_3$ is limited to the range of about 0.1 to 20 mol % is that, when less than about 0.1 mol % is added, the effect of the addition cannot be recognized and when more than about 20 mol % is added, the resistance value and the B constant become too large. Furthermore, there is greater change in resistance under high humidity environments.

DESCRIPTION OF THE PREFERRED EMBODIMENTS

Hereinafter, the embodiments of a semiconductor ceramic and a negative temperature coefficient thermistor according to the present invention are described.

Figure 1:
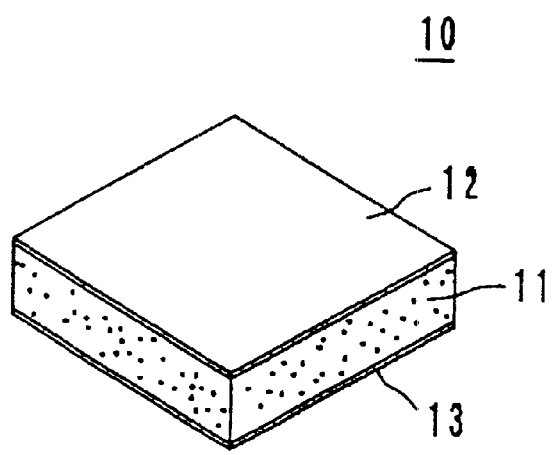
FIG. 1 is a perspective view showing a first negative temperature coefficient thermistor according to the present invention.

First Negative Temperature Coefficient Thermistor, FIG. 1

FIG. 1 shows a first negative temperature coefficient thermistor 10 according to the present invention in which an element assembly 11 is formed by using a semiconductor ceramic having a negative temperature coefficient of resistance and electrodes 12 and 13 are provided on both main surfaces of the element assembly 11.

In the semiconductor ceramic having a negative temperature coefficient of resistance, about 0.1 to 20 mol of at least one of $CaMnO_3$, $SrMnO_3$, $BaMnO_3$, $LaMnO_3$, $PrMnO_3$, $NdMnO_3$, $SmMnO_3$, $EuMnO_3$, $GdMnO_3$, $TbMnO_3$, $DyMnO_3$ and $HoMnO_3$ is added to a spinel family composite oxide comprising a solid solution of Mn and at least one of Ti, V, Cr, Fe, Co, Ni, Cu, Zn, Mg and Al. The materials and manufacturing method are described in detail below in embodiments 1 to 4.

Electrodes 12 and 13 are formed by a method using a thick-film material such as printing, etc., or a method using a thin-film material such as evaporation, sputtering, etc., where generally known electrode materials are used, and the materials and the method for forming electrodes are optional.

Figure 2:
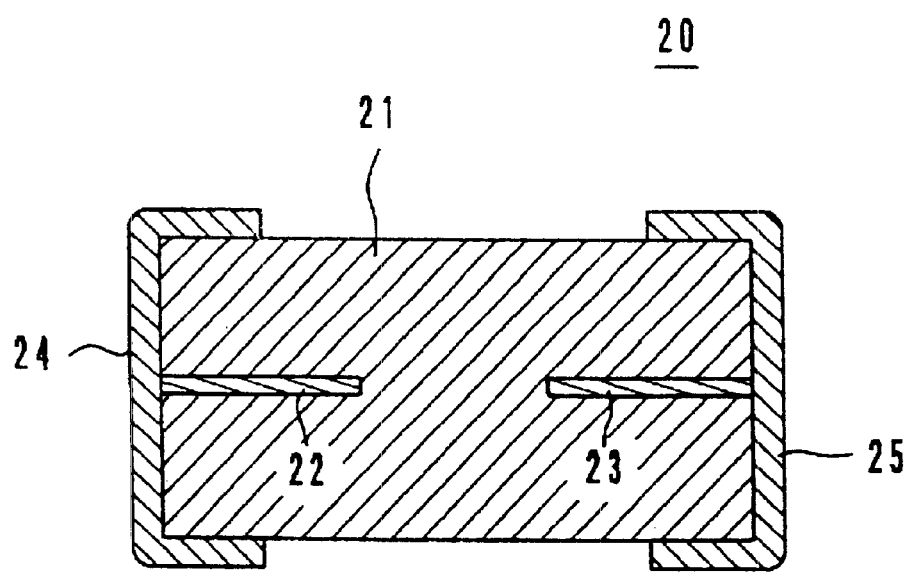
FIG. 2 is a sectional view showing a second negative temperature coefficient thermistor according to the present invention.

Second Negative Temperature Coefficient Thermistor FIG. 2

FIG. 2 shows a second negative temperature coefficient thermistor 20 according to the present invention in which internal electrodes 22 and 23 are provided inside an element assembly 21 composed of a plurality of sheets made of a semiconductor ceramic having a negative temperature coefficient of resistance and external electrodes 24 and 25 are provided on the surface of the element assembly 21.

The semiconductor ceramic having a negative temperature coefficient of resistance is identical to the one in the first negative temperature coefficient thermistor 10, and the material and the method are described in detail as embodiment 5.

The internal electrodes 22 and 23 are formed by, for example, coating a paste of conductive material on a sheet, other sheets are attached by pressure to form a laminated body, and the laminated body is baked. Furthermore, the external electrodes 24 and 25 may be formed by coating a silver paste on both end portions of the laminated body and baking it. Moreover, the material and the method for forming the electrodes 22 to 25 can be chosen at the discretion of the manufacturer.

Embodiment 1

$Mn_3O_4$ and $BaCO_3$, mixed such that the atomic ratio of Ba/M becomes 1 are prepared as raw materials. After having been fired at 1300° C. for two hours, the raw material is crushed by a pulverizer and is then finely ground for 20 hours by a ball mill to obtain a fine powder of $BaMnO_3$.

Next, as shown in Table 1, the powder of $BaMnO_3$ is added to $Mn_3O_4$, NiO and $Fe_2O_3$ weighed in a weight ratio of 50:30:20 and they are mixed for 16 hours by the ball mill. The raw material is fired at 900° C. for two hours and crushed by the pulverizer. Next, 10 weight % of polyvinyl alcohol as an organic binder, 0.5 weight % of glycerine as a plasticizer and 1.0 weight % of a polyvinyl dispersant are added to the crushed raw material, and mixed for 16 hours. Then, a sheet-forming slurry is obtained by removing coarse particles using a 250-mesh screen. The slurry obtained is formed into a 50 μm thick ceramic green sheet by using a doctor blade.

The ceramic green sheet is punched into a fixed size and the sheet is laminated so as to be 1 mm thick and subjected to a pressure of 2 ton/cm² in thickness direction. After having been fired at 1150° C. for 2 hours, the laminated body is polished to a thickness of 0.5 mm, and a silver paste is coated on both main surfaces of the laminated body and baked at 700° C. for 10 minutes. Then, the laminated body is cut by a dicing saw to a chip size of 2×2 mm, and a negative temperature coefficient thermistor element with dimensions of 2.0×2.0×0.5 mm is obtained (see FIG. 1). Furthermore, samples with $BaCO_3$ added instead of $BaMnO_3$ were also prepared for comparison. The samples marked with an asterisk are different from the samples according to the present invention.

One hundred pieces of negative temperature coefficient thermistor elements obtained in this way were selected by random sampling, their resistance ($R_{25}$) at a temperature of 25° C. and resistance ($R_{50}$) at a temperature of 50° C. measured, and, based on the measured values, the specific resistance ($\rho_{25}$) and B constant ($B_{25/50}$) calculated. Moreover, the specific resistance was determined by using the resistance ($R_{25}$) at a temperature of 25° C. and the dimensions of the element. Furthermore, B constant was determined by the following formula (expression) using the resistance ($R_{25}$) at a temperature of 25° C. and the resistance ($R_{50}$) at a temperature of 50° C.

Formula 1

$$B \text{ constant (K)} = \frac{\ln R_{25} (\Omega) - \ln R_{50} (\Omega)}{1/298.15 - 1/323.15} \quad (1)$$

Next, the chips under test were left in a constant temperature oven at 125° C. and a constant temperature and constant humidity bath set at 60° C. and 95 % RH for 1000 hours, and then the rate of change of resistance was measured. The measurements are shown in Table 1.

From Table 1, it can be understood that the rate of change of resistance improves significantly under the high humidity environmental condition by adding $BaMnO_3$ instead of $BaCoO_3$. Furthernore, when the addition of $BaMnO_3$ is about 0.1 mol % or less, the effect of the addition cannot be recognized, and when the addition of $BaMnO_3$ is about 20 mol % or more, it is understood that the resistance sharply increases and the rate of change of resistance increases under high humidity environmental conditions.

TABLE 1

| No. | $BaMnO_3$ (mol %) | $BaCO_3$ (mol %) | Initial characteristics | | High temperature environmental test | High humidity environmental test |
|---|---|---|---|---|---|---|
| | | | $\rho_{25}/\Omega \cdot cm$ | B constant/K | $\Delta R_{25}/\%$ | $\Delta R_{25}/\%$ |
| 1* | 0 | 0 | 3852 | 3457 | +5.1 | +0.2 |
| 2* | 0.05 | 0 | 3860 | 3458 | +4.4 | +0.2 |
| 3 | 0.1 | 0 | 3863 | 3458 | +0.8 | +0.4 |
| 4 | 0.5 | 0 | 3868 | 3460 | +0.8 | +0.4 |
| 5 | 1 | 0 | 3868 | 3460 | +0.7 | +0.3 |
| 6 | 5 | 0 | 3880 | 3465 | +0.2 | +0.1 |
| 7 | 10 | 0 | 3886 | 3466 | +0.2 | +0.2 |
| 8 | 20 | 0 | 3892 | 3468 | +0.3 | +0.5 |
| 9* | 25 | 0 | 5723 | 3563 | +1.9 | +2.9 |
| 10* | 0 | 1 | 3924 | 3480 | +0.6 | +2.1 |
| 11* | 0 | 10 | 4020 | 3495 | +0.3 | +2.8 |
| 12* | 0 | 20 | 4106 | 3520 | +0.4 | +3.7 |

Embodiment 2

Mn$_3$O$_4$, CaCO$_3$, SrCO$_3$ and BaCO$_3$, mixed such that the atomic ratio of Ca/Mn, Sr/Mn, and Ba/Mn become 1, are prepared as a raw material. After having been fired at 1300° C. for 2 hours, the raw material is crushed by the pulverizer and then fine grounded for 20 hours by the ball mill to obtain a fine powder of CaMnO$_3$, SrMnO$_3$ and BaMnO$_3$.

Next, as shown in Table 2, the powder of CaMnO$_3$, SrMnO$_3$ and BaMnO$_3$ is added to Mn$_3$O$_4$, NiO and CoO$_4$ weighed in the weight ratio of 45:25:30 and were mixed for 16 hours by the ball mill. The raw material is fired at 900° C. for 2 hours and crushed by the pulverizer. Next, 10 weight % of polyvinyl alcohol as an organic binder, 0.5 weight % of glycerine as a plasticizer and 1.0 weight % of a polyvinyl dispersant are added to the crushed raw material, and mixed for 16 hours. Then, a sheet-forming slurry is obtained by removing coarse particles using a 250-mesh screen. The slurry obtained is formed into a 50 μm thick ceramic green sheet by using a doctor blade.

The ceramic green sheet is punched into a fixed size and the sheet is laminated to a thickness of 1 mm and subjected to a pressure of 2 ton/cm$^2$ in the thickness direction. After having been fired at 1200° C. for 2 hours, the laminated body is polished to a thickness of 0.5 mm, and a silver paste is coated on both surfaces of the laminated body and baked at 700° C. for 10 minutes. Then, the laminated body is cut by a dicing saw to a chip size of 2×2 mm, and a negative temperature coefficient thermistor element with dimensions of 2.0×2.0×0.5 mm is obtained (see FIG. 1). Furthermore, samples with CaCO$_3$, SrCO$_3$ and BaCO$_3$ added instead of CaMnO$_3$, SrMnO$_3$ and BaMnO$_3$ were also prepared. The samples marked with an asterisk are different from the samples according to the present invention.

One hundred pieces of negative temperature coefficient thermistor elements obtained in this way were selected by random sampling, their resistance (R$_{25}$) at a temperature of 25° C. and resistance (R$_{50}$) at a temperature of 50° C. were measured, and, based on the measured values, the specific resistance (ρ$_{25}$) and B constant (B$_{25/50}$) were calculated. The specific resistance was then determined by using the resistance (R$_{25}$) at a temperature of 25° C. and the dimensions of the element. Subsequently, B constant was determined by the above formula using the resistance (R$_{25}$) at a temperature of 25° C. and the resistance (R$_{50}$) at a temperature of 50° C.

Next, the chips under test were left in a constant temperature oven at 125° C. and a constant temperature and constant humidity bath set at 60° C. and 95 % RH for 1000 hours, and then the rate of change of the resistance was measured. The result of the measurements here are also shown in Table 2.

From Table 2, it is understood that the rate of change of resistance is greatly improved under high humidity environmental conditions by adding CaMnO$_3$, SrMnO$_3$ and BaMnO$_3$ instead of CaCO$_3$, SrCO$_3$ and BaCO$_3$. Furthermore, when the total addition of CaMnO$_3$, SrMnO$_3$ and BaMnO$_3$ is about 0.1 mol % or less, the effect of the addition cannot be recognized, and when the addition of CaMnO$_3$, SrMnO$_3$, and BaMnO$_3$ exceeds about 20 mol %, it is understood that the resistance increases and the rate of change of resistance increases under high humidity environmental conditions.

TABLE 2

| No. | CaMnO$_3$ (mol %) | SrMnO$_3$ (mol %) | BaMnO$_3$ (mol %) | Initial characteristics ρ$_{25}$/Ω · cm | Initial characteristics B constant/K | High temperature environmental test ΔR$_{25}$ (%) | High humidity environmental test ΔR$_{25}$ (%) |
|---|---|---|---|---|---|---|---|
| 1* | 0 | 0 | 0 | 1247 | 3820 | +7.5 | +0.3 |
| 2* | 0.05 | 0 | 0 | 1247 | 3819 | +7.1 | +0.3 |
| 3 | 0.05 | 0.05 | 0 | 1250 | 3822 | +0.9 | +0.3 |
| 4 | 0 | 1 | 1 | 1253 | 3223 | +0.7 | +0.4 |
| 5 | 3 | 0 | 2 | 1260 | 3826 | +0.4 | +0.4 |
| 6 | 2 | 2 | 2 | 1258 | 3825 | +0.4 | +0.3 |
| 7 | 5 | 5 | 0 | 1270 | 3830 | +0.3 | +0.3 |
| 8 | 5 | 5 | 5 | 1284 | 3835 | +0.3 | +0.4 |
| 9 | 10 | 2 | 3 | 1281 | 3833 | +0.3 | +0.4 |
| 10 | 5 | 10 | 5 | 1296 | 3846 | +0.4 | +0.4 |
| 11* | 10 | 10 | 5 | 2689 | 4030 | +1.1 | +1.7 |
| 12* | 10 | 20 | 0 | 2814 | 4102 | +1.1 | +1.9 |

Embodiment 3

La$_2$O$_3$ and Mn$_3$O$_4$, mixed such that the atomic ratio of La/Mn becomes 1, are prepared as a raw material. After having been fired at 800° C. for 2 hours, the raw material is crushed by the pulverizer and then fine ground for 20 hours by the ball mill to obtain a fine powder of LaMnO$_3$.

Next, the powder of LaMnO$_3$ at the ratio as shown in Table 3 is added to Mn$_3$O$_4$, NiO and Fe$_2$O$_3$ weighed in the weight ratio of 50:30:20, and they are mixed for 16 hours by the ball mill. This material is fired at 900° C. for 2 hours and crushed by the pulverizer. Next, 10 weight % of polyvinyl alcohol as an organic binder, 0.5 weight % of glycerine as a plasticizer 1.0 weight % of a polyvinyl dispersant are added to the crushed raw material, and mixed for 16 hours. Then, sheet-forming slurry was obtained by removing coarse particles using a 250-mesh screen. The slurry obtained is formed into a 50 μm thick ceramic green sheet by using a doctor blade.

This ceramic green sheet is punched into a fixed size, and the sheet is laminated so as to be 1 mm thick in total and subjected to a pressure of 2 ton/cm$^2$ in the thickness direction. After having been fired at 1150° C. for 2 hours, the laminated body is polished to a thickness of 0.5 mm, and a silver paste is coated on both surfaces of the laminated body and baked at 700° C. for 10 minutes. Then, the laminated body is cut by a dicing saw to a chip size of 2×2 mm, and a negative temperature coefficient thermistor element with dimensions of 2.0×2.0×0.5 mm is obtained (see FIG. 1). Furthermore, samples with $La_2O_3$ instead of $LaMnO_3$ were also prepared for comparison. The samples marked with an asterisk in Table 3 are different from the samples according to the present invention.

One hundred pieces of negative temperature coefficient thermistor elements obtained in this way were selected by random sampling, their resistance ($R_{25}$) at a temperature of 25° C. and resistance ($R_{50}$) at a temperature of 50° C. were measured, and, based on the measured values, the specific resistance ($\rho_{25}$) and B constant ($B_{25/50}$) were calculated. The specific resistance was determined by using the resistance ($R_{25}$) at a temperature of 25° C. and the dimensions of the element.

Subsequently, B constant was determined by the above formula using the resistance ($R_{25}$) at a temperature of 25° C. and the resistance ($R_{50}$) at a temperature of 50° C.

Next, the chips under test were left in a constant temperature oven at 125° C. and a constant temperature and constant humidity bath set at 60° C. and 95 % RH for 1000 hours, and then the rate of change of resistance was measured. The measurements are shown in Table 3.

From Table 3, it is understood that the rate of change of resistance is greatly improved under the high humidity environmental condition by adding $LaMnO_3$ instead of $La_2O_3$. Furthermore, when the addition of $LaMnO_3$ is about 0.1 mol % or less, the effect of the addition cannot be recognized, and when the addition of $LaMnO_3$ is about 20 mol % or more, it can be understood that the resistance sharply increases and the rate of change of resistance increases under high humidity environmental conditions.

for 16 hours. Then, sheet-forming slurry was obtained by removing coarse particles using a 250-mesh screen. The slurry obtained was formed into a 50 μm thick ceramic green sheet by using a doctor blade.

This ceramic green sheet is punched into a fixed size, and a number of sheets are laminated so as to be 1 mm thick in total and pressed at a pressure of 2 ton/$cm^2$ in the thickness direction. After having been fired at 1200° C. for 2 hours, the laminated body is polished to a thickness of 0.5 mm, and a silver paste is coated on both surfaces of the laminated body and baked at 700° C. for 10 minutes. Then, the laminated body is cut by a dicing saw to a chip size of 2×2 mm, and a negative temperature coefficient thermistor element with dimensions of 2.0×2.0×0.5 mm is obtained (see FIG. 1). Furthermore, samples with $La_2O_3$ instead of $LaMnO_3$ added were also prepared for comparison. The samples marked with an asterisk in Table 4 are different from the samples according to the present invention.

One hundred pieces of negative temperature coefficient thermistor elements obtained in this way were selected by random sampling, their resistance ($R_{25}$) at a temperature of 25° C. and resistance ($R_{50}$) at a temperature of 50° C. were measured, and, based on the measured values, the specific resistance ($\rho_{25}$) and B constant $B_{25/50}$) were calculated. Moreover, the specific resistance was determined by using resistance ($R_{25}$) at a temperature of 25° C. and the dimensions of the element. Furthermore, B constant was determined by the above formula using the resistance ($R_{25}$) at a temperature of 25° C. and the resistance ($R_{50}$) at a temperature of 50° C.

Next, the chips under test were left in a constant temperature oven at 125° C. and a constant temperature and

TABLE 3

| No. | $LaMnO_3$ (mol %) | $La_2O_3$ (mol %) | Initial characteristics | | High temperature environmental test | High humidity environmental test |
|---|---|---|---|---|---|---|
| | | | $\rho_{25}/\Omega \cdot cm$ | B constant/K | $\Delta R_{25}$ (%) | $\Delta R_{25}$ (%) |
| 1* | 0 | 0 | 3852 | 3457 | +5.1 | +0.2 |
| 2* | 0.05 | 0 | 3839 | 3457 | +3.5 | +0.4 |
| 3 | 0.1 | 0 | 3826 | 3456 | +0.9 | +0.4 |
| 4 | 0.5 | 0 | 3727 | 3443 | +0.5 | +0.4 |
| 5 | 1 | 0. | 3610 | 3427 | +0.4 | +0.3 |
| 6 | 5 | 0 | 2885 | 3330 | +0.2 | +0.2 |
| 7 | 10 | 0 | 2306 | 3251 | +0.2 | +0.2 |
| 8 | 20 | 0 | 1646 | 3158 | +0.3 | +0.5 |
| 9* | 25 | 0 | 1439 | 3129 | +0.4 | +2.1 |
| 10* | 0 | 1 | 3924 | 3480 | +0.5 | +3.1 |
| 11* | 0 | 10 | 4020 | 3495 | +0.4 | +3.8 |
| 12* | 0 | 20 | 4106 | 3520 | +0.7 | +3.9 |

Embodiment 4

$La_2O_3$, $SrCO_3$ and $MnCO_4$, which are mixed such that the atomic ratio is Sr: La: Mn=0.05:0.95:1, are prepared as raw materials. After having been fired at 800° C. for 2 hours, the raw material is crushed by the pulverizer and then fine-ground for 20 hours by the ball mill to obtain a fine powder of $Sr_{0.5}La_{0.95}MnO_3$.

Next, the powder of $Sr_{0.5}La_{0.95}MnO_3$ as shown in Table 4 is added to $Mn_3O_4$, $Fe_2O_3$ and $Co_3O_4$ weighed in the weight ratio of 45:25:30, and they are mixed for 16 hours by the ball mill. This raw material was fired at 900° C. for 2 hours and crushed by the pulverizer. Next, 10 weight % of polyvinyl alcohol as an organic binder, 0.5 weight % of glycerine as a plasticizer, and 1.0 weight % of a polyvinyl dispersant are added to the crushed raw material, and mixed constant humidity bath set at 60° C. and 95 % RH for 1000 hours, and then the rate of change of resistance was measured. The measurements are shown in Table 4.

From Table 4, it is understood that the rate of change of resistance is greatly improved under the high humidity environmental condition by adding $Sr_{0.5}La_{0.95}MnO_3$ instead of $La_2O_3$. Furthermore, when the total addition of $Sr_{0.5}La_{0.95}MnO_3$ is about 0.1 mol % or less, the effect of the addition cannot be recognized, and when the addition of $Sr_{0.5}La_{0.95}MnO_3$ is about 20 mol % or more, it is understood that the resistance decreases and the rate of change of resistance increases under high humidity environmental conditions.

TABLE 4

| No. | $Sr_{0.5}La_{0.95}MnO_3$ (mol %) | Initial characteristics $\rho_{25}/\Omega \cdot cm$ | B constant/K | High temperature environmental test $\Delta R_{25}$ (%) | High humidity environmental test $\Delta R_{25}$ (%) |
|---|---|---|---|---|---|
| 1* | 0 | 3852 | 3457 | +5.1 | +0.2 |
| 2* | 0.05 | 1557 | 3455 | +2.5 | +0.7 |
| 3 | 0.1 | 1545 | 3451 | +0.7 | +0.3 |
| 4 | 0.5 | 1453 | 3420 | +0.4 | +0.2 |
| 5 | 1 | 1353 | 3387 | +0.3 | +0.4 |
| 6 | 5 | 871 | 3231 | +0.3 | +0.1 |
| 7 | 10 | 602 | 3147 | +0.2 | +0.3 |
| 8 | 20 | 373 | 3077 | +0.5 | +1.5 |
| 9* | 25 | 313 | 3059 | +0.7 | +3.2 |

Embodiment 5

$Mn_3O_4$ and $CaCO_3$, mixed such that the atomic ratio of Ca/M becomes 1, are prepared as a raw material. After having been fired at 1300° C. for two hours, the raw material is crushed by the pulverizer and then finely ground for 20 hours by the ball mill to obtain a fine powder of $CaMnO_3$.

Next, the powder of $CaMnO_3$ as shown in Table 5 is added to $Mn_3O_4$, NiO and $Al_2O_3$ weighed in the weight ratio of 65:30:5, and they are mixed for 16 hours by the ball mill. The raw material is fired at 900° C. for two hours and crushed by the pulverizer. Next, 10 weight % of polyvinyl alcohol as an organic binder, 0.5 weight % of glycerine as a placticizer, and 1.0 weight % of a polyvinyl dispersant are added to the crushed raw material, and mixed for 16 hours. Then, sheet-forming slurry was obtained by removing coarse particles using a 250-mesh screen. The slurry obtained is formed into a 50 μm thick ceramic green sheet by using a doctor blade.

This ceramic green sheet is punched into a fixed size, and a Pt paste constituting an internal electrode is screen printed on the surface of a ceramic green sheet. A plurality of green sheets are laminated above and below the green sheet on. which the Pt paste is printed and positioned at the center in the thickness direction to be 1 mm in total thickness, and subjected to a pressure of 2 ton/$cm^2$. After having been fired at 1200° C. for 2 hours, the laminated body obtained is barrel polished to form a ceramic element assembly with dimensions of 2.0×1.25×0.85 mm. A silver paste is coated on both end portions of the element assembly and baked at 850° C. for 10 minutes to form external electrodes, and thus a negative temperature coefficient thermistor element (see FIG. 2) was obtained. Furthermore, samples with $CaCO_3$ added instead of $CaMnO_3$ were also prepared for comparison. The samples marked with an asterisk are different to the samples according to the present invention.

One hundred pieces of negative temperature coefficient thermistor elements obtained in this way were selected by random sampling, their resistance ($R_{25}$) at a temperature of 25° C. and resistance ($R_{50}$) at a temperature of 50° C. were measured, and, based on those measured values, the specific resistance ($\rho_{25}$) and B constant ($B_{25/50}$) were calculated. Moreover, the specific resistance was determined by using the resistance ($R_{25}$) at a temperature of 25° C. and the dimensions of the element. Furthermore, B constant was determined by the above formula using the resistance ($R_{25}$) at a temperature of 25° C. and the resistance ($R_{50}$) at a temperature of 50° C.

Next, the chips under test were left in a constant temperature oven at 125° C. and a constant temperature and constant humidity bath set at 60° C. and 95 % RH for 1000 hours, and then the rate of change of resistance was measured. The measurements are shown in Table 5.

From Table 5, it is understood that, even in laminated type chip thermistor elements, when $CaMnO_3$ is added instead of $CaCO_3$, the rate of change of resistance is greatly improved under high humidity environments.

TABLE 5

| No. | $CaMnO_3$ (mol %) | $Ca_2O_3$ (mol %) | Initial characteristics $\rho_{25}/\Omega \cdot cm$ | B constant/K | High temperature environmental test $\Delta R_{25}$ (%) | High humidity environmental test $\Delta R_{25}$ (%) |
|---|---|---|---|---|---|---|
| 1* | 0 | 0 | 68210 | 4084 | +3.4 | +0.2 |
| 2 | 5 | 0 | 71540 | 4098 | +0.1 | +0.2 |
| 3* | 0 | 5 | 70920 | 4095 | +0.3 | +2.1 |

As can be understood from the above description, water soluble ions do not remain after firing and sintering in a semiconductor ceramic having a negative temperature coefficient of resistance according to the present invention, and therefore, the reaction of binders when molded and the change of resistance under high humidity environments can be suppressed. Furthermore, the reliability is greatly improved and a highly accurate apparatus having a small deviation of resistance can be obtained in a negative temperature coefficient thermistor according to the present invention.

What is claimed is:

1. A semiconductor ceramic having a negative temperature coefficient of resistance, comprising:
    a spinel composite oxide comprising a solid solution of Mn and at least one element selected from the group consisting of Ti, V, Cr, Fe, Co, Ni, Cu, Zn, Mg and Al; and about 0.1 to 20 mol % of $AMnO_3$, wherein A is at least one member selected from the group consisting of Ca, Sr, Ba, La, Pr, Nd, Sm, Eu, Gd, Tb, Dy and Ho.

2. A semiconductor ceramic having a negative temperature coefficient of resistance according to claim 1, wherein
the spinel composite oxide comprises a solid solution of Mn and at least one element selected from the group consisting of Fe, Co, Ni and Al; and
A represents at least one member of the group consisting of Ca, Sr, Ba and La.

3. A semiconductor ceramic having a negative temperature coefficient of resistance according to claim 1, wherein
the spinel composite oxide comprises a solid solution of Mn, Ni and at least one element selected from the group consisting of Fe, Co and Al; and
A represents at least one member of the group consisting of Ca, Sr, Ba and La.

4. A semiconductor ceramic having a negative temperature coefficient of resistance according to claim 1, wherein $AMnO_3$ is $BaMnO_3$, $LaMnO_3$, $Sr_{0.5}La_{0.95}MnO_3$, $CaMnO_3$ $SrMnO_3$ or a mixture thereof.

5. A semiconductor ceramic having a negative temperature coefficient of resistance according to claim 4 in the form of an element assembly having a surface and having a pair of spaced electrodes on the surface of the element assembly thereby forming a negative temperature coefficient thermistor.

6. A semiconductor ceramic having, a negative temperature coefficient of resistance according to claim 4 in the form of an element assembly having a surface and having a pair of spaced electrodes inside the element assembly thereby forming a negative temperature coefficient thermistor.

7. A semiconductor ceramic having a negative temperature coefficient of resistance according to claim 3 in the form of an element assembly having a surface and having a pair of spaced electrodes on the surface of the element assembly thereby forming a negative temperature coefficient thermistor.

8. A semiconductor ceramic having a negative temperature coefficient of resistance according to claim 3 in the form of an element assembly having a surface and having a pair of spaced electrodes inside the element assembly thereby forming a negative temperature coefficient thermistor.

9. A semiconductor ceramic having a negative temperature coefficient of resistance according to claim 2 in the form of an element assembly having a surface and having a pair of spaced electrodes on the surface of the element assembly thereby forming a negative temperature coefficient thermistor.

10. A semiconductor ceramic having a negative temperature coefficient of resistance according to claim 2 in the form of an element assembly having a surface and having a pair of spaced electrodes inside the element assembly thereby forming a negative temperature coefficient thermistor.

11. A semiconductor ceramic having a negative temperature coefficient of resistance according to claim 1 in the form of an element assembly having a surface and having a pair of spaced electrodes on the surface of the element assembly thereby forming a negative temperature coefficient thermistor.

12. A semiconductor ceramic having a negative temperature coefficient of resistance according to claim 1 in the form of an element assembly having a surface and having a pair of spaced electrodes inside the element assembly thereby forming a negative temperature coefficient thermistor.

* * * * *